US009428270B1

(12) United States Patent
Tofte et al.

(10) Patent No.: US 9,428,270 B1
(45) Date of Patent: Aug. 30, 2016

(54) SYSTEM AND METHOD FOR CONTROLLING A REMOTE AERIAL DEVICE FOR UP-CLOSE INSPECTION

(71) Applicant: STATE FARM MUTUAL AUTOMOBILE INSURANCE COMPANY, Bloomington, IL (US)

(72) Inventors: Nathan L. Tofte, Downs, IL (US); James M. Freeman, Normal, IL (US); Brian N. Harvey, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 11 days.

(21) Appl. No.: 14/717,025

(22) Filed: May 20, 2015

Related U.S. Application Data

(63) Continuation of application No. 14/305,272, filed on Jun. 16, 2014, now Pat. No. 9,085,363, which is a continuation of application No. 13/893,904, filed on May 14, 2013, now Pat. No. 8,818,572.

(60) Provisional application No. 61/801,501, filed on Mar. 15, 2013.

(51) Int. Cl.
*B64C 39/02* (2006.01)
*B64C 19/00* (2006.01)
*G06Q 40/00* (2012.01)
(Continued)

(52) U.S. Cl.
CPC ............. *B64C 39/024* (2013.01); *B64C 19/00* (2013.01); *G05D 1/0094* (2013.01); *G05D 1/12* (2013.01); *G06Q 40/00* (2013.01)

(58) Field of Classification Search
None
See application file for complete search history.

(56) References Cited

U.S. PATENT DOCUMENTS

| 3,170,206 A | 2/1965 | Triplett |
| 3,767,152 A | 10/1973 | Killinger |
| 3,883,926 A | 5/1975 | Reynolds |

(Continued)

FOREIGN PATENT DOCUMENTS

| WO | WO-2012/145780 A2 | 11/2012 |
| WO | WO 2012145780 A2 * | 11/2012 |

OTHER PUBLICATIONS

Naderhirn, WO2012145780_IFW, Published Nov. 1, 2012 (translation from IFW).*

(Continued)

*Primary Examiner* — Jelani Smith
(74) *Attorney, Agent, or Firm* — Marshall, Gerstein & Borun LLP; Randall G. Rueth

(57) ABSTRACT

The method and system may be used to control the movement of a remote aerial device in an incremental step manner during a close inspection of an object or other subject matter. At the inspection location, a control module "stabilizes" the remote aerial device in a maintained, consistent hover while maintaining a close distance to the desired object. The control module may retrieve proximal sensor data that indicates possible nearby obstructions to the remote aerial device and may transmit the data to a remote control client. The remote control module may determine and display the possible one or more non-obstructed directions that the remote aerial device is capable of moving by an incremental distance. In response to receiving a selection of one of the directions, the remote control module may transmit the selection to the remote aerial device to indicate the next movement for the remote aerial device.

20 Claims, 3 Drawing Sheets

(51) Int. Cl.
*G05D 1/00* (2006.01)
*G05D 1/12* (2006.01)

(56) References Cited

U.S. PATENT DOCUMENTS

| | | | |
|---|---|---|---|
| 5,035,558 A | 7/1991 | Prosen | |
| 5,076,079 A | 12/1991 | Monoson et al. | |
| 5,207,171 A | 5/1993 | Westwood, III | |
| 5,730,246 A | 3/1998 | Beard | |
| 5,875,867 A | 3/1999 | Beard | |
| 5,913,479 A | 6/1999 | Westwood, III | |
| 5,950,169 A | 9/1999 | Borghesi et al. | |
| 5,975,499 A | 11/1999 | Ostrobrod | |
| 6,112,853 A | 9/2000 | Beard | |
| 6,181,837 B1 | 1/2001 | Cahill et al. | |
| 6,201,482 B1 | 3/2001 | Schiefele et al. | |
| 6,266,610 B1 | 7/2001 | Schultz et al. | |
| 6,574,377 B1 | 6/2003 | Cahill et al. | |
| 7,061,401 B2 | 6/2006 | Voos et al. | |
| 7,130,066 B1 | 10/2006 | Kanematu | |
| 7,343,307 B1 | 3/2008 | Childress | |
| 7,458,238 B2 | 12/2008 | Stolk et al. | |
| 7,523,910 B2 | 4/2009 | Moran | |
| 7,752,286 B2 | 7/2010 | Anderson et al. | |
| 7,809,587 B2 | 10/2010 | Dorai et al. | |
| 7,889,931 B2 | 2/2011 | Webb et al. | |
| 7,953,615 B2 | 5/2011 | Aquila et al. | |
| 7,984,500 B1 | 7/2011 | Khanna et al. | |
| 8,025,125 B2 | 9/2011 | Vetesnik et al. | |
| 8,265,963 B1 | 9/2012 | Hanson et al. | |
| 8,284,194 B2 | 10/2012 | Zhang et al. | |
| 8,370,373 B2 | 2/2013 | Yamamoto | |
| 8,374,957 B1 | 2/2013 | Garcia et al. | |
| 8,392,036 B2 | 3/2013 | Jacobsen et al. | |
| 8,401,879 B1 | 3/2013 | Kazenas | |
| 8,423,272 B2 | 4/2013 | Judd et al. | |
| 8,510,196 B1 | 8/2013 | Brandmaier et al. | |
| 8,527,305 B1 | 9/2013 | Hanson et al. | |
| 8,537,338 B1 | 9/2013 | Medasani et al. | |
| 8,543,486 B2 | 9/2013 | Donoho et al. | |
| 8,651,206 B2 | 2/2014 | Slawinski et al. | |
| 8,756,085 B1 | 6/2014 | Plummer et al. | |
| 8,818,572 B1 | 8/2014 | Tofte et al. | |
| 8,872,818 B2 | 10/2014 | Freeman et al. | |
| 8,874,454 B2 | 10/2014 | Plummer et al. | |
| 8,931,144 B2 | 1/2015 | Freeman et al. | |
| 9,002,719 B2 | 4/2015 | Tofte | |
| 9,082,015 B2 | 7/2015 | Christopulos et al. | |
| 9,098,655 B2 | 8/2015 | Plummer et al. | |
| 2002/0030142 A1 | 3/2002 | James | |
| 2002/0035488 A1 | 3/2002 | Aquila et al. | |
| 2002/0055861 A1 | 5/2002 | King et al. | |
| 2002/0060267 A1 | 5/2002 | Yavnai | |
| 2002/0123830 A1 | 9/2002 | Cundiff | |
| 2003/0067461 A1 | 4/2003 | Fletcher et al. | |
| 2003/0154111 A1 | 8/2003 | Dutra et al. | |
| 2003/0200123 A1 | 10/2003 | Burge et al. | |
| 2003/0212478 A1 | 11/2003 | Rios | |
| 2004/0030587 A1 | 2/2004 | Danico et al. | |
| 2005/0007633 A1 | 1/2005 | Kadowaki | |
| 2005/0108065 A1 | 5/2005 | Dorfstatter | |
| 2005/0143870 A1 | 6/2005 | Yoshio et al. | |
| 2005/0144189 A1 | 6/2005 | Edwards et al. | |
| 2005/0159889 A1 | 7/2005 | Isaac | |
| 2005/0165517 A1 | 7/2005 | Reich | |
| 2005/0276401 A1 | 12/2005 | Madill et al. | |
| 2006/0031103 A1 | 2/2006 | Henry | |
| 2006/0289233 A1 | 12/2006 | Flaherty | |
| 2007/0050360 A1 | 3/2007 | Hull et al. | |
| 2007/0093945 A1 | 4/2007 | Grzywna et al. | |
| 2007/0179868 A1 | 8/2007 | Bozym | |
| 2008/0174789 A1 | 7/2008 | Uffenkamp et al. | |
| 2008/0208400 A1 | 8/2008 | Bouchet et al. | |
| 2009/0018717 A1 | 1/2009 | Reed et al. | |
| 2009/0027253 A1 | 1/2009 | van Tooren et al. | |
| 2009/0028003 A1 | 1/2009 | Behm et al. | |
| 2009/0055226 A1 | 2/2009 | Tritz et al. | |
| 2009/0076665 A1 | 3/2009 | Hoisington et al. | |
| 2009/0119132 A1 | 5/2009 | Bolano et al. | |
| 2009/0138290 A1 | 5/2009 | Holden | |
| 2009/0148068 A1 | 6/2009 | Woodbeck | |
| 2009/0171516 A1 | 7/2009 | Reich | |
| 2009/0212157 A1 | 8/2009 | Arlton et al. | |
| 2009/0265193 A1 | 10/2009 | Collins et al. | |
| 2010/0004802 A1 | 1/2010 | Bodin et al. | |
| 2010/0084513 A1* | 4/2010 | Gariepy et al. | 244/190 |
| 2010/0094664 A1 | 4/2010 | Bush et al. | |
| 2010/0104191 A1 | 4/2010 | McGwire | |
| 2010/0111370 A1 | 5/2010 | Black et al. | |
| 2010/0161155 A1 | 6/2010 | Simeray | |
| 2010/0174422 A1 | 7/2010 | Jacobsen et al. | |
| 2010/0228406 A1 | 9/2010 | Hamke et al. | |
| 2010/0292871 A1 | 11/2010 | Schultz et al. | |
| 2010/0302359 A1 | 12/2010 | Adams et al. | |
| 2010/0305778 A1 | 12/2010 | Dorneich et al. | |
| 2011/0006174 A1 | 1/2011 | Hollinger | |
| 2011/0046817 A1* | 2/2011 | Hamke | G05D 1/101 701/3 |
| 2011/0049290 A1 | 3/2011 | Seydoux et al. | |
| 2011/0090110 A1* | 4/2011 | Tralshawala et al. | 342/25 A |
| 2011/0178658 A1 | 7/2011 | Kotaba et al. | |
| 2011/0187713 A1 | 8/2011 | Pershing et al. | |
| 2011/0221692 A1 | 9/2011 | Seydoux et al. | |
| 2011/0302091 A1 | 12/2011 | Hornedo | |
| 2012/0004793 A1 | 1/2012 | Block | |
| 2012/0013617 A1 | 1/2012 | Zhang et al. | |
| 2012/0059578 A1 | 3/2012 | Venkatraman | |
| 2012/0076437 A1 | 3/2012 | King | |
| 2012/0179431 A1 | 7/2012 | Labrie et al. | |
| 2012/0203450 A1 | 8/2012 | Meyer et al. | |
| 2012/0215380 A1 | 8/2012 | Fouillade et al. | |
| 2012/0303179 A1 | 11/2012 | Schempf | |
| 2013/0051637 A1 | 2/2013 | Kulcke et al. | |
| 2013/0051639 A1 | 2/2013 | Woodford et al. | |
| 2013/0233964 A1 | 9/2013 | Woodworth et al. | |
| 2013/0262153 A1 | 10/2013 | Collins et al. | |
| 2013/0321393 A1 | 12/2013 | Winder | |
| 2014/0100889 A1 | 4/2014 | Tofte | |
| 2014/0163775 A1 | 6/2014 | Metzler | |
| 2014/0168420 A1* | 6/2014 | Naderhirn et al. | 348/128 |
| 2014/0226182 A1 | 8/2014 | Lee et al. | |
| 2014/0278570 A1 | 9/2014 | Plummer et al. | |
| 2014/0278587 A1 | 9/2014 | Plummer et al. | |
| 2014/0297065 A1 | 10/2014 | Tofte et al. | |
| 2014/0324405 A1 | 10/2014 | Plummer et al. | |
| 2014/0324483 A1 | 10/2014 | Plummer et al. | |

OTHER PUBLICATIONS

Beard et al., Autonomous vehicle technologies for small fixed-wing UAVs, J. Aerospace Computing Info. Commun. (Jan. 2005).
Cost Containment, Product and Solutions for the Property and Casualty Insurance Industry, Computer Sciences Corporation (1999).
Final Office Action, U.S. Appl. No. 13/647,098, dated Nov. 1, 2013.
Final Office Action, U.S. Appl. No. 13/647,098, dated Oct. 9, 2014.
Final Office Action, U.S. Appl. No. 13/836,695, dated Feb. 25, 2014.
Final Office Action, U.S. Appl. No. 13/839,634, dated Mar. 21, 2014.
Final Office Action, U.S. Appl. No. 13/839,634, Dec. 2, 2014.
Final Office Action, U.S. Appl. No. 14/269,920, dated Feb. 11, 2015.
Final Office Action, U.S. Appl. No. 14/323,626, dated Apr. 3, 2015.
Final Office Action, U.S. Appl. No. 14/496,802, dated May 4, 2015.
Final Office Action, U.S. Appl. No. 14/496,840, dated May 5, 2015.
Final Office Action, U.S. Appl. No. 14/656,185, dated Jun. 25, 2015.
Foo et al., Three-dimensional path planning of unmanned aerial vehicles using particle swarm optimization, AIAA (Sep. 2006).
Kluckner et al., Image based building classification and 3D modeling with super-pixels, ISPRS Technical Commission II Symposium, PCV 2010, vol. XXXVIII, part 3A, pp. 233-238 (Sep. 3, 2010).

(56) References Cited

OTHER PUBLICATIONS

Merz et al., Beyond Visual Range Obstacle Avoidance and Infrastructure Inspection by an Autonomous Helicopter, IEEE (Sep. 2011).
Nonfinal Office Action, U.S. Appl. No. 13/647,098, dated Apr. 26, 2013.
Nonfinal Office Action, U.S. Appl. No. 13/647,098, dated Mar. 14, 2014.
Nonfinal Office Action, U.S. Appl. No. 13/836,695, dated Oct. 3, 2013.
Nonfinal Office Action, U.S. Appl. No. 13/839,634, dated Aug. 5, 2014.
Nonfinal Office Action, U.S. Appl. No. 13/839,634, dated Oct. 25, 2013.
Nonfinal Office Action, U.S. Appl. No. 14/269,920, dated Jul. 13, 2015.
Nonfinal Office Action, U.S. Appl. No. 14/269,920, dated Sep. 25, 2014.
Nonfinal Office Action, U.S. Appl. No. 14/318,521, dated Oct. 10, 2014.
Nonfinal Office Action, U.S. Appl. No. 14/323,626, dated Sep. 17, 2014.
Nonfinal Office Action, U.S. Appl. No. 14/496,802, dated Jan. 2, 2015.
Nonfinal Office Action, U.S. Appl. No. 14/496,840, dated Jan. 5, 2015.
Nonfinal Office Action, U.S. Appl. No. 14/631,568, dated May 19, 2015.
Nonfinal Office Action, U.S. Appl. No. 14/656,185, dated Apr. 2, 2015.
Notice of Allowance, U.S. Appl. No. 13/647,098, mailed Dec. 10, 2014.
Notice of Allowance, U.S. Appl. No. 13/836,695, dated Jun. 27, 2014.
Notice of Allowance, U.S. Appl. No. 13/839,634, dated Mar. 13, 2015.
Notice of Allowance, U.S. Appl. No. 14/318,521, dated Apr. 10, 2015.
U.S. Appl. No. 14/496,802, "Methods and Systems for Capturing the Condition of a Physical Structure via Detection of Electromagnetic Radiation", filed Sep. 25, 2014.
U.S. Appl. No. 14/496,840, "Methods and Systems for Capturing the Condition of a Physical Structure via Audio-Based 3D Scanning", filed Sep. 25, 2014.
U.S. Appl. No. 14/631,558, "Methods and Systems for Capturing the Condition of a Physical Structure via Chemical Detection", filed Feb. 25, 2015.
U.S. Appl. No. 14/631,568, "Laser-based Methods and Systems for Capturing the Condition of a Physical Structure", filed Feb. 25, 2015.
UTC Spotlight: Superstorm Sandy LiDAR Damage Assessment to Change Disaster Recovery, Feb. 2013.
Woodbeck et al., "Visual cortex on the GPU: Biologically inspired classifier and feature descriptor for rapid recognition," IEEE Computer Society Conference on Computer Vision and Pattern Recognition Workshops 2008, pp. 1-8 (2008).

* cited by examiner

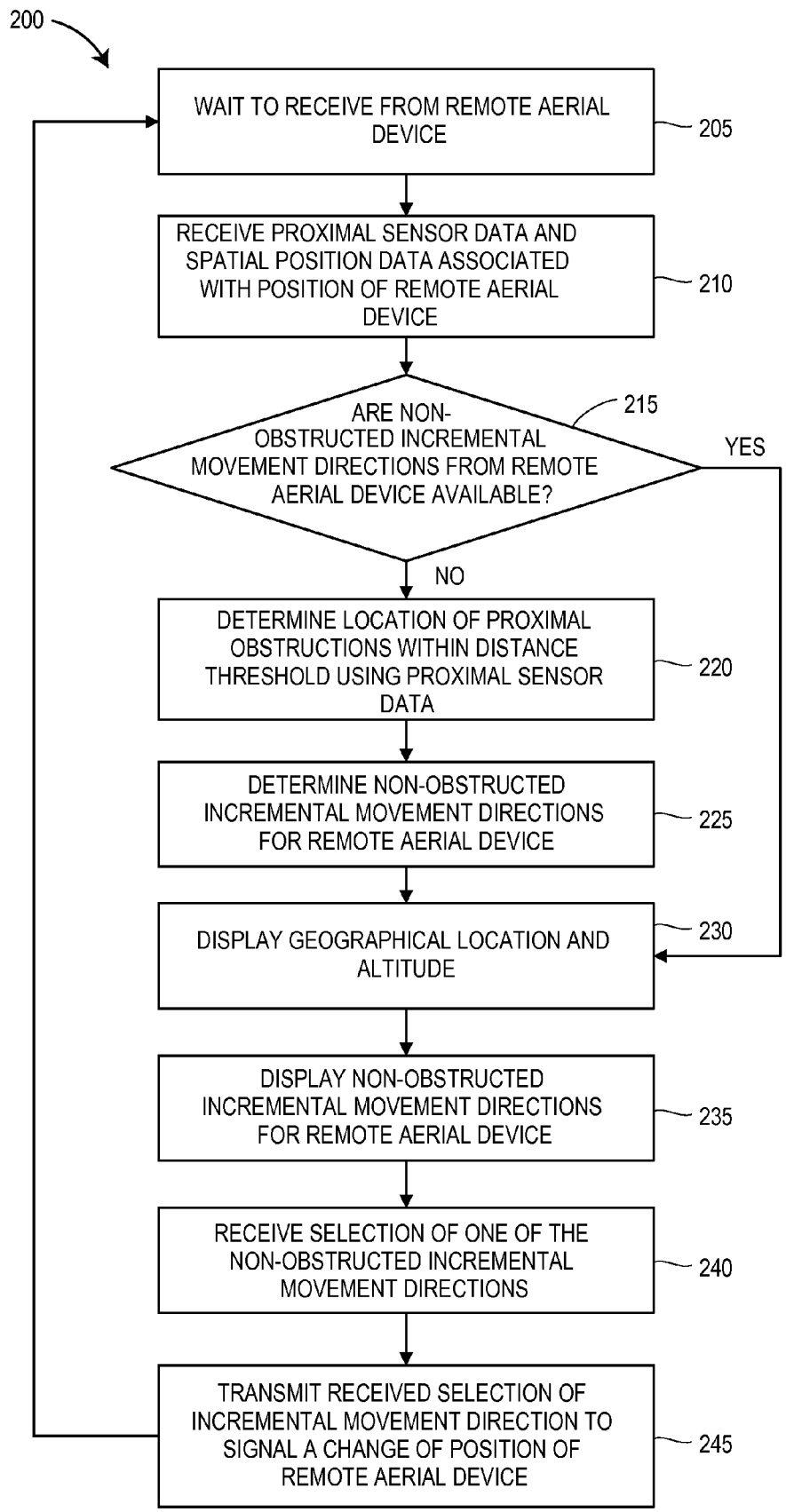

SYSTEM AND METHOD FOR CONTROLLING A REMOTE AERIAL DEVICE FOR UP-CLOSE INSPECTION

CROSS-REFERENCE TO RELATED APPLICATIONS

This application is a continuation of U.S. patent application Ser. No. 14/305,272, filed Jun. 16, 2014, which is a continuation of U.S. patent application Ser. No. 13/893,904 (subsequently issued as U.S. Pat. No. 8,818,572), filed May 14, 2013, which application claims the benefit of U.S. Provisional Application No. 61/801,501, entitled "System and Method for Controlling A Remote Aerial Device For Up-Close Inspection," filed Mar. 15, 2013, which are hereby incorporated herein by reference in their entirety.

FIELD OF THE DISCLOSURE

The present disclosure relates to remote controlled devices and, more particularly, to precisely controlling a remote aerial device for up-close inspection of a subject.

BACKGROUND

After an accident or loss, property owners typically file claims with their insurance companies. In response to these claims, the insurance companies assign an agent to investigate the claims to determine the extent of damage and/or loss and to provide their clients with appropriate compensation.

Often, the claim investigations can be time-consuming, difficult and even dangerous for the insurance agents. For example, in order to investigate a claim for damage to a home owner's roof, an agent may have to climb onto the roof, and perform inspections while on the owner's roof. By climbing on the roof and attempting to maneuver around the roof to perform his inspection, the insurance agent opens himself to a real risk of injury, especially in difficult weather conditions where the roof may be slippery because of rain, snow, and/or ice and winds may be severe.

Even if the insurance agent performs the inspection without getting injured, performing the full investigation may still be time-consuming. In addition to the time required to drive to and from the incident site and to perform the inspection itself, significant paperwork and calculations may be involved in calculating compensation owed to the clients. For example, if an insurance agent takes photos on the roof of a client's building to assess a claim for roof damage from a hurricane, in order to calculate how much money should be paid to the client, the agent may have to come back to his office, research the client's property, research the cost of the damaged property and research repair costs. All of these steps are time consuming and both delay payment to the client and prevent the agent from assessing other client claims.

In situations where the insurance company has received a large number of claims in a short time period (e.g., when a town is affected by a hurricane, tornado, or other natural disaster), an insurance agent may not have time to perform timely claim investigations of all the received claims. If claim investigations are not performed quickly, property owners may not receive recovery for their losses for long periods of time. Additionally, long time delays when performing claim investigations can lead to inaccurate investigations results (e.g., the delay may lead to increased opportunity for fraud and/or may make it more difficult to ascertain the extent of damage at the time of the accident or loss).

Insurance companies have recently attempted to use remote controlled devices to assist in investigating claims. In this case, the insurance agent generally visits the site of the claim and uses a remote controlled device to investigate a roof of a client. The device may include a remote controlled balloon, a helicopter, a robot capable of scaling a building, etc. The remote controlled device may employ a camera, video camcorder, etc. to gather data about subject matter related to the claim (e.g., the roof of the client) and may transmit this data to the user whom remains firmly on the ground. However, the insurance agent is required to visit the site because the remote controlled device, generally, is controlled by a short distance radio controlled handheld console. Furthermore, the operator must have extensive flight training and practice time to successfully and safely operate the remote controlled device.

BRIEF DESCRIPTION OF THE DRAWINGS

FIG. 3 is a flow diagram of an example method for controlling a remote aerial device for up-close inspection.

DETAILED DESCRIPTION

Generally, a remote control system may be used to control the movement of a remote aerial device in an incremental step manner during a close inspection of an object or other subject matter. A user may desire to closely inspect an object or a subject from a remote location using a remote aerial device. The user may deploy a remote aerial device with data collection equipment to the location of the object using standard navigation techniques for an unmanned aerial vehicle. After the remote aerial device reaches the location, a control module operating on the remote aerial device may enter the remote aerial device into an "inspection" mode in which the control module "stabilizes" the remote aerial device in a maintained, consistent hover that is substantially stationary in three dimensional space, while maintaining a close distance to the object. The control module may retrieve proximal sensor data that indicates possible nearby obstructions (e.g., walls, trees, buildings, radio towers, landscapes, etc.) from the proximity sensors on board the remote aerial device. Moreover, the proximal sensors may be implemented to detect objects within a specific distance threshold within any three dimension of the stationary hover position of the remote aerial device. The control module may retrieve a geographic location and an altitude that corresponds to the current hover position of the remote aerial device.

The control module may transmit this proximal sensor data, the geographic location, and the altitude to a remote control module that operates on a remote control client. The remote control module may determine the possible one or more non-obstructed directions that the remote aerial device is capable of moving by an incremental distance. The incremental distance may be a predetermined distance or may be dynamic depending on certain environments or situations. The remote control module may display, or otherwise indicate, the one or more possible non-obstructed directions that the remote aerial device may move to the user. In response to receiving a selection of one of the directions from the user, the remote control module may transmit the selection to the control module operating on the remote aerial device. The control module may move the remote aerial device by the incremental distance in the direction of the selected direction and, again, may stabilize the remote aerial device.

Figure 1:
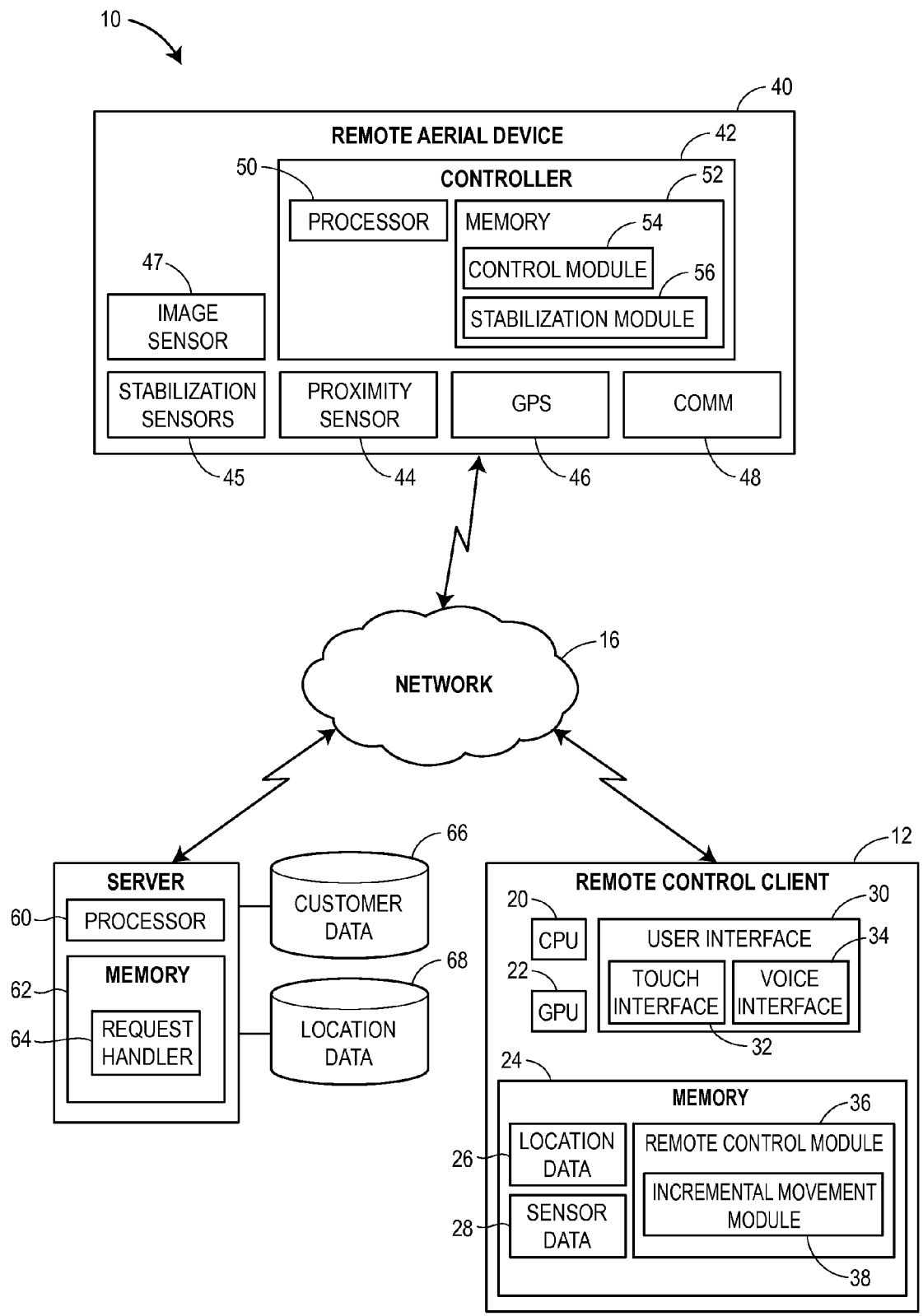
FIG. 1 is a block diagram of an example system in which techniques for remotely controlling a remote aerial device are implemented.

Referring first to FIG. 1, a system 10 includes a remote control client 12 coupled to both a remote aerial device 40 and a server 14 via a communication network 16. The remote control client 12 may be, for example, a laptop computer, a tablet computer, a smartphone, etc. In the embodiment illustrated in FIG. 1, the remote control client 12 includes a central processing unit (CPU) 20, a graphics processing unit (GPU) 22, a computer-readable memory 24, and a user interface 30 including a touch interface 32, voice interface 34, etc. In various implementations, the touch interface 32 can include a touchpad over which the user moves his fingers while looking at a separately provided screen, a touchscreen where the user places his fingers directly over the image being manipulated or over a displayed control being activated (e.g. a displayed keyboard), etc. In other implementations, the voice interface 34 may include any device that includes a microphone, such as a Bluetooth ear piece, a smartphone, etc. The memory 24 is a computer-readable non-transitory storage device that may include both persistent (e.g., a hard disk) and non-persistent (e.g., RAM) memory components, stores instructions executable on the CPU 20 and/or the GPU 22 that make up a remote control module 36 and location data 26 and sensor data 28 on which the remote control module 36 operates. The remote control module 36 includes an incremental movement module 38 that allows a user to easily control the remote aerial device 40 via step-like, incremental movements in which one incremental movement is in response to one single user command.

The remote control module 36 according to various implementations operates as a separately executable software application, a plugin that extends the functionality of another software application such as a web browser, an application programming interface (API) invokable by a software application, etc. The instructions that make up the remote control module 36 may be compiled and executable on the CPU 20 and/or the GPU 22 directly, or not compiled and interpreted by the CPU 20 at runtime. Further, the incremental movement module 38 may be provided as an integral part of the remote control module 36 or as a separately installable and downloadable component.

Referring still to FIG. 1, the remote aerial device 40 includes a controller 42 that communicates with one or more proximity sensors 44, one or more stabilization sensors 45, a Global Positioning System (GPS) unit 46, an image sensor 47, and a communications unit 48. The controller 42 includes a processor 50 that executes instructions from a computer-readable memory 52 to implement a control module 54 and a stabilization module 56. The control module 54 may invoke the stabilization module 56 to retrieve data from the stabilization sensors 45 (i.e., sensors relating avionics) to implement a control function, such as that associated with a control routine that performs PID (proportional-integral-derivative), fuzzy logic, nonlinear, etc. control to maintain the stability of the remote aerial device 40. For instance, the stabilization sensors 45 may include one or more of a directional speed sensor, a rotational speed sensors, a tilt angle sensor, an inertial sensor, an accelerometer sensor, or any other suitable sensor for assisting in stabilization of an aerial craft. The stabilization module 54 may utilize the data retrieved from these stabilization sensors 45 to control the stability of the remote aerial device 40 in a maintained, consistent hover that is substantially stationary in three dimensional space while maintaining close distance (e.g., 12-18 inches) to the object. Of course, the stabilization module 56 may implement any suitable technique of stabilizing the remote aerial device 40 in a hover or stationary three dimensional position.

The control module 54 may retrieve data from the proximity sensors 44 to determine nearby objects, obstructions, etc. that hinder movement of the remote aerial device 40. These proximity sensors 44 may include any sensor or technique that assists the control module 44 in determining a distance and a direction to any nearby object. The one or more proximity sensors 44 may include ultrasonic sensors, infrared sensors, LIDAR (Light Detection and Ranging), a stereo vision system (SVS) that may utilize the image sensors 47 (e.g., one or more cameras) to implement stereoscopic imaging techniques to determine a distance, and/or any other suitable method in determining the distance from the remote aerial device 40 to a nearby object.

The GPS unit 46 may use "Assisted GPS" (A-GPS), satellite GPS, or any other suitable global positioning protocol or system that locates the position the device. For example, A-GPS utilizes terrestrial cell phone towers or wi-fi hotspots (e.g., wireless router points) to more accurately and more quickly determine location of the device while satellite GPS generally are more useful in more remote regions that lack cell towers or wifi hotspots. The communication unit 48 may communicate with the server 14 via any suitable wireless communication protocol network, such as a wireless telephony network (e.g., GSM, CDMA, LTE, etc.), a wi-fi network (802.11 standards), a WiMAX network, a Bluetooth network, etc.

In an example scenario, the server 14 receives a request that specifies a customer, a structure, a pre-stored route, etc. The server 14 in response retrieves insurance data (e.g., customer biographical information, type of property, etc.), and location data (e.g., a property location of a customer, etc.) from a customer database 66 and a location database 68, respectively. The server 14 then provides the customer data, the location data, and appropriate indications of how certain portions of the customer data and the location data are linked, to the remote control client 12 as part of the location data 42. The remote control client 12 may use this location data to determine a geographic location that the remote aerial device is initially sent. Of course, the customer database 66 and the location database 68 may be disposed within the remote control client 12 depending on implementations.

Figure 2:
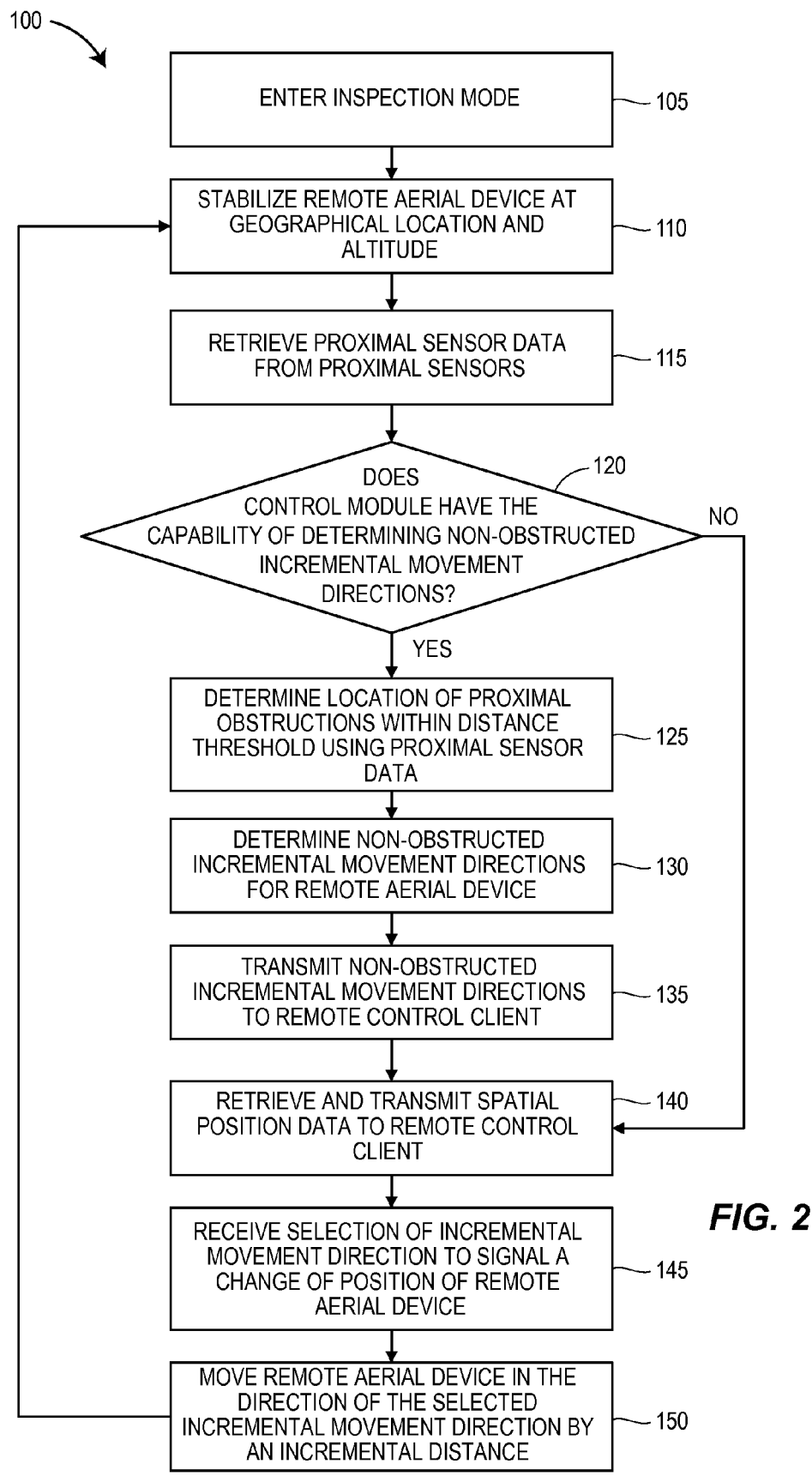
FIG. 2 is a flow diagram of an example method for collecting and transmitting proximal sensor data via a remote aerial device.

FIG. 2 depicts a flow diagram illustrating an exemplary method for collecting proximal sensor data for transmittal to the remote control client 12. The method 100 begins when the remote aerial device 40, after arriving at a selected target location for closely inspecting an object, transitions into an "inspection" mode (block 105) (opposed to "flight" or "transitory" mode, i.e., travel to the target). While in inspection mode, the remote aerial device generally remains within close range to the inspected object or the subject and moves slowly to capture images, videos, audio, or any other type of data from the object or the subject. A user, via the remote control client, may select this target location by entering the global position coordinates, an address, etc. or may retrieve the target location from the customer database 66 and the location database 68 in which the target location may be associated with a customer's name or a customer identifier (e.g., policy number, etc.). For example, in responding to a submitted insurance claim, an insurance agent may wish to inspect a customer's property via the system 10. The agent, via the remote control client 12, may invoke the remote control module 36 to request from the server 14 and databases 66, 68 the location of the property (i.e., the target location) associated with the customer's name. In this example, the remote control client may send the remote aerial device 40 to the target location using this requested property location. The target location may include a specific geographic location and a specific altitude that is predetermined to be a obstruction free position for the remote aerial device to enter into the inspection mode from the transitory mode.

After the remote aerial device transitions into inspection mode, the control module 54 may invoke the stabilization module 56 to stabilize the remote aerial device 40 at the specific geographic location and the specific altitude associated with the target location (block 110). With the remote aerial device "stabilized" in a substantially stationary position, the control module 54 may retrieve proximal sensor data from the proximity sensors 44 (block 115). The method 100 additionally includes determining whether the control module 54 includes the capability of determining non-obstructed incremental movement directions of the remote aerial device 40 (block 120). If the control module does include this capability, then the control module 54 determines the location of the proximal obstructions within a distance threshold using the retrieved proximal data (block 125). For example, the control module 54 may utilize an absolute compass and determine the position or the location of each obstruction relative to a cardinal ordinate or may base the direction of the obstructions relative to the direction the remote aerial device 40 is facing. The control module 54 may incorporate one or more locations of mountings of proximity sensors 44 on the remote aerial device 40 in determining the position of nearby objects relative to the remote aerial device 40. For example, if two proximity sensors 44 are mounted on a right side of the remote aerial device 40, the control module 54 may determine a location of a nearby obstruction relative to the right side of the remote aerial device 40.

Referring to FIG. 2, after determining the locations of the nearby obstructions, the control module 54 may determine one or more possible non-obstructed directions for the remote aerial device 40 to incrementally move (block 130). While the remote aerial device 40 remains in the hover stationary position, the control module 54 may adhere to a specific movement pattern, such as only moving in the six main three dimensional directions (e.g., forward, backward, sideways to the left, sideways to the right, up, and down), moving with higher degrees of freedom within a two dimensional plane level that runs parallel to the ground with up and down (e.g., eight directions in the two dimensional plane, up, and down), or any other movement regime that is suitable for an untrained remote control operator. Thus, the control module 54 may determine the possible non-obstructed directions for the remote aerial device 40 to incrementally move while adhering to a specific movement pattern. For example, if the control module 54 is using the six main three dimensional directions and obstructions are discovered to be located above and below (within the distance threshold), the control module 54 determines that the only directions of possible movement for the remote aerial device 40 are forward, backward, sideways to the left, and sideways to the right.

In response to this determination, the control module 54 may transmit the determined directions of possible movement to remote control client 12 (block 135). Additionally, the control module 54 may retrieve and transmit spatial position data (e.g., a geographic location and an altitude) to the remote control client (block 140). Likewise, referring back to the block 120, if the control module 54 does not include the capability in determining non-obstructed incremental movement directions, the control module 54 may transfer control to the block 140 to transmit only the spatial position data. The remote control module 12 may receive a selection of one of the directions of possible movement from the user and transmit the selection to the control module 54 of remote aerial device 40 (described below). The control module 54 may receive the selection (block 145) and may move the remote aerial device 40 by the distance of one incremental movement. The distance of the one incremental movement may be a predetermined distance, such as one inch, one foot, etc., or may dynamically driven based the context of the object to be inspected (e.g., a single family house, large urban skyscraper, etc.) After traveling the distance of the one incremental movement, the control module 54 may invoke the stabilization module 56 again to bring the remote aerial device 40 back into a stationary hover position at the block 110.

FIG. 3 depicts a flow diagram illustrating an exemplary method for controlling the remote aerial device 40 for inspection of an object or a subject. The method 200 begins with the remote control module 36 waiting to receive data from the control module 54 after the remote aerial device enters inspection mode (block 205). The method 200 includes the remote control module 36 receiving proximal sensor data and spatial position data that is associated with the current position of the remote aerial device 40 (block 210). The remote control module 36 may process this spatial position data into a geographic location and an altitude associated with the current position of the remote aerial device 40. The geographic location may be stored in the memory 24 of the remote control client 12 or may be stored into the location database 68 for future analysis or to recreate the current route of the remote aerial device 40. The remote control module 36 may use the determined geographic location and the altitude to provide context to user when displaying any information relating to the remote aerial device 40. For instance, the remote control module 36 may invoke the incremental movement module 38 to display the geographic location of the remote aerial device 40 on a displayed map in conjunction and in relation to possible directions of incremental movements of the remote aerial device 40.

Referring to FIG. 3, the remote control module 36 determines whether any possible non-obstructed incremental movement directions are available or received from the remote aerial device 40 (block 215). If no possible directions are provided by the remote aerial device 40, the remote control module 36 may determine the location of proximal obstructions with the distance threshold using the proximal sensor data (block 220). The remote control module 36 may determine the location of proximal obstructions in a similar manner to the determination performed by control module 30 at the block 125 in FIG. 2. Likewise, as illustrated in FIG. 3, the remote control module 36 may determine one or more possible non-obstructed directions for the remote aerial device to incrementally move in a similar manner to the determination performed by the control module 40 in the block 130 in FIG. 2 (block 225).

Referring back to FIG. 3, the remote control module 36 may invoke the increment movement module 38 to display the geographic location and the altitude in conjunction with the determined possible directions that the remote aerial device 40 may move incrementally in a non-obstructed manner (blocks 230, 235). In response to displaying the possible directions of movement, the remote control module may receive a selection of one of the directions of movement via the user interface 30 (block 240). For example, the remote control module 36 may receive the selection via a tapping gesture on the touch interface 32. Likewise, the selection may be received by a voice command via the voice interface 34. Upon receiving the selection, the remote control module 36 transmits the selection of the direction of movement to the control module 54 to signal a change in position of the remote aerial device 40 (block 245).

Similarly, the remote control module 36 may also receive a selection of a rate of speed of the remote aerial device 40 from the user or, of course, the rate of speed may also be predetermined. The control module 54 may use this rate of speed to implement a constant rate of speed on the remote aerial device 40 in the case that the user selects multiple incremental movements or selects the movements in a rapid succession. The constant rate of speed may be beneficial in obtaining smooth video data from the image sensors 47. Moreover, the system 10 also allows for the remote aerial device 40 to capture images of the object (e.g., a single family house) via the image sensors 47 and to image process the captured images, to produce a waypoint route for the remote aerial device 40 to follow in lieu of human input. Alternatively, a user may input the waypoints manually and determine a constant rate of speed of the remote aerial device 40 for the route. The system 10 may incorporate a payload weight of the remote aerial device 40 to determine a number of waypoints and speed. The system 10 may also create a travel boundary that bounds or contains the remote aerial device 40 within the travel boundary.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components or modules. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In some cases, a hardware module may include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a SaaS. For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for providing an interface for inspecting indoor and outdoor map data through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for remotely controlling a remote aerial device for up-close inspection of an object, the method comprising:
controlling the remote aerial device to move to an initial target location in a transitory mode, wherein the initial target location is located in proximity to a portion of the object to be inspected; and
causing the remote aerial device to operate in an inspection mode while the remote aerial device is located less than an inspection threshold distance from the object to be inspected, comprising, for each of a plurality of movements between a plurality of hovering locations of the remote aerial device in the inspection mode:
receiving, from one or more sensors of the remote aerial device, proximal sensor data indicating one or more directions toward one or more proximal obstructions, each proximal obstruction being located within a distance threshold of a current hovering location of the remote aerial device;
determining a plurality of incremental movement directions based at least in part upon the proximal sensor data, each incremental movement direction indicating potential non-obstructed linear movement of the remote aerial device of a fixed distance in a direction from the current hovering location to one of a plurality of potential hovering locations;
receiving, at a remote control module, a selection from a user of one of the plurality of incremental movement directions indicating a target hovering location selected from the plurality of potential hovering locations;

controlling the remote aerial device to move from the current hovering location to the target hovering location based upon the selected incremental movement direction; and causing the remote aerial device to remain at the target hovering location until a further selection is received from the user.

2. The method of claim 1, wherein the inspection threshold distance is at least twelve inches and no more than eighteen inches.

3. The method of claim 1, wherein the inspection threshold distance is determined based upon a type of the object to be inspected.

4. The method of claim 1, further comprising causing the remote aerial device to stabilize at the initial target location until the selection of the incremental movement direction is received.

5. The method of claim 1, wherein controlling the remote aerial device to move to the initial target location in the transitory mode comprises selecting, via a user interface, an indication of global positioning system (GPS) coordinates and an altitude.

6. The method of claim 1, wherein:
controlling the remote aerial device in the transitory mode causes the remote aerial device to move at a first speed;
controlling the remote aerial device in the inspection mode causes the remote aerial device to move at a second speed; and
the second speed is slower than the first speed.

7. The method of claim 1, wherein causing the remote aerial device to operate in the inspection mode further comprises causing the remote aerial device to capture a plurality of images of the object while the remote aerial device is controlled in the inspection mode.

8. A tangible, non-transitory computer-readable medium storing instructions for remotely controlling a remote aerial device for up-close inspection of an object that, when executed by one or more processors of a computer system, cause the computer system to:

control the remote aerial device to move to an initial target location in a transitory mode, wherein the initial target location is located in proximity to a portion of the object to be inspected; and cause the remote aerial device to operate in an inspection mode while the remote aerial device is located less than an inspection threshold distance from the object to be inspected by, for each of a plurality of movements between a plurality of hovering locations of the remote aerial device in the inspection mode:

receiving, from one or more sensors of the remote aerial device, proximal sensor data indicating one or more directions toward one or more proximal obstructions, each proximal obstruction being located within a distance threshold of a current hovering location of the remote aerial device;

determining a plurality of incremental movement directions based at least in part upon the proximal sensor data, each incremental movement direction indicating potential non-obstructed linear movement of the remote aerial device of a fixed distance in a direction from the current hovering location to one of a plurality of potential hovering locations;

receiving, at a remote control module, a selection of one of the plurality of incremental movement directions indicating a target hovering location selected from the plurality of potential hovering locations;

controlling the remote aerial device to move from the current hovering location to the target hovering location based upon the selected incremental movement direction; and causing the remote aerial device to remain at the target hovering location until a further selection is received from the user.

9. The tangible, non-transitory computer-readable medium of claim 8, wherein the inspection threshold distance is at least twelve inches and no more than eighteen inches.

10. The tangible, non-transitory computer-readable medium of claim 8, wherein the inspection threshold distance is determined based upon a type of the object to be inspected.

11. The tangible, non-transitory computer-readable medium of claim 8, wherein the executable instructions further cause the computer system to cause the remote aerial device to stabilize at the initial target location until the selection of the incremental movement direction is received.

12. The tangible, non-transitory computer-readable medium of claim 8, wherein the instructions that cause the computer system to control the remote aerial device to move to the initial target location in the transitory mode comprise receiving a selection of an indication of global positioning system (GPS) coordinates and an altitude from a user interface.

13. The tangible, non-transitory computer-readable medium of claim 8, wherein:
controlling the remote aerial device in the transitory mode causes the remote aerial device to move at a first speed;
controlling the remote aerial device in the inspection mode causes the remote aerial device to move at a second speed; and
the second speed is slower than the first speed.

14. The tangible, non-transitory computer-readable medium of claim 8, wherein the instructions that cause the computer system to cause the remote aerial device to operate in the inspection mode further comprise instructions that cause the computer system to cause the remote aerial device to capture a plurality of images of the object while the remote aerial device is controlled in the inspection mode.

15. A computer system for remotely controlling a remote aerial device for up-close inspection of an object, comprising:

a remote aerial device having one or more sensors;
a remote control module having one or more processors; and
a program memory coupled to the one or more processors and storing executable instructions that when executed by the one or more processors cause the computer system to:

control the remote aerial device to move to an initial target location in a transitory mode, wherein the initial target location is located in proximity to a portion of the object to be inspected; and cause the remote aerial device to operate in an inspection mode while the remote aerial device is located less than an inspection threshold distance from the object to be inspected by, for each of a plurality of movements between a plurality of hovering locations of the remote aerial device in the inspection mode:

receiving, from one or more sensors of the remote aerial device, proximal sensor data indicating one or more directions toward one or more proximal obstructions, each proximal obstruction being located within a distance threshold of a current hovering location of the remote aerial device;

determining a plurality of incremental movement directions based at least in part upon the proximal sensor data, each incremental movement direction indicating potential non-obstructed movement of the remote aerial device of a fixed distance in a direction from the current hovering location to one of a plurality of potential hovering locations;

receiving, at a remote control module, a selection of one of the plurality of incremental movement directions indicating a target hovering location selected from the plurality of potential hovering locations;

controlling the remote aerial device to move from the current hovering location to the target hovering location based upon the selected incremental movement direction; and causing the remote aerial device to remain at the target hovering location until a further selection is received from the user.

16. The computer system of claim 15, wherein the inspection threshold distance is at least twelve inches and no more than eighteen inches.

17. The computer system of claim 15, wherein the inspection threshold distance is determined based upon a type of the object to be inspected.

18. The computer system of claim 15, further comprising executable instructions that cause the computer system to cause the remote aerial device to stabilize at the initial target location until the selection of the incremental movement direction is received.

19. The computer system of claim 15, wherein:
controlling the remote aerial device in the transitory mode causes the remote aerial device to move at a first speed;
controlling the remote aerial device in the inspection mode causes the remote aerial device to move at a second speed; and
the second speed is slower than the first speed.

20. The computer system of claim 15, wherein the instructions that cause the computer system to cause the remote aerial device to operate in the inspection mode further comprise instructions that cause the computer system to cause the remote aerial device to capture a plurality of images of the object while the remote aerial device is controlled in the inspection mode.

* * * * *